(12) United States Patent
Chiriku et al.

(10) Patent No.: US 6,541,700 B2
(45) Date of Patent: Apr. 1, 2003

(54) JUNCTION BOX AND JUNCTION BOX FORMING METHOD

(75) Inventors: Akihiko Chiriku, Shizuoka-ken (JP); Norio Ito, Shizuoka-ken (JP); Hiroyuki Sasaki, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/131,082

(22) Filed: Apr. 25, 2002

(65) Prior Publication Data

US 2002/0157847 A1 Oct. 31, 2002

(30) Foreign Application Priority Data

Apr. 27, 2001 (JP) ......................................... 2001-133314

(51) Int. Cl.⁷ ................................................ H02G 3/08
(52) U.S. Cl. ......................... 174/50; 174/60; 174/52.1; 439/76.2; 439/949
(58) Field of Search ................. 174/50, 52.1, 52.4, 174/59, 60, 61, 54, 58, 251, 254, 255; 220/3.2, 4.02; 439/76.2, 949, 364, 402; 361/651, 644

(56) References Cited

U.S. PATENT DOCUMENTS

| | | | | |
|---|---|---|---|---|
| 5,295,842 A | * | 3/1994 | Ozaki et al. ................... 174/59 |
| 5,310,353 A | * | 5/1994 | Parrish et al. ................ 29/850 |
| 5,653,607 A | * | 8/1997 | Saka et al. .................. 439/402 |
| 5,755,579 A | * | 5/1998 | Yanase et al. ............. 439/76.2 |
| 5,764,487 A | * | 6/1998 | Natsume .................... 439/76.2 |
| 5,822,189 A | * | 10/1998 | Isshiki ......................... 174/59 |
| 5,823,819 A | * | 10/1998 | Kondo et al. ................ 439/487 |
| 5,877,944 A | * | 3/1999 | Onizuka ..................... 361/644 |
| 5,902,138 A | * | 5/1999 | Murakami .................. 439/76.2 |
| 5,995,380 A | * | 11/1999 | Maue et al. ................. 174/254 |
| 6,077,102 A | * | 6/2000 | Borzi et al. ................. 439/364 |
| 6,116,916 A | * | 9/2000 | Kasai ........................ 439/76.2 |
| 6,121,548 A | * | 9/2000 | Matsuoka .................... 174/59 |
| 6,126,458 A | * | 10/2000 | Gregory et al. ............. 439/364 |
| 6,194,656 B1 | * | 2/2001 | Kondo et al. ............... 174/251 |
| 6,270,359 B1 | * | 8/2001 | Kondo et al. .............. 439/76.2 |
| 6,270,360 B1 | * | 8/2001 | Yanase ..................... 439/76.2 |
| 6,350,949 B1 | * | 2/2002 | Boyd ........................... 174/50 |
| 6,402,530 B1 | * | 6/2002 | Saito et al. ................ 439/76.2 |

* cited by examiner

*Primary Examiner*—Dean A. Reichard
*Assistant Examiner*—Angel R. Estrada
(74) *Attorney, Agent, or Firm*—Finnegan, Henderson, Farabow, Garrett, & Dunner, L.L.P.

(57) ABSTRACT

A junction box (10) includes an upper case (13), a lower case (12) disposed under the upper case (13), and a junction box body (14) accommodated between the upper case (13) and the lower case (12). The junction box body (14) further includes an upper cover (16) having an embedding stage (24) provided thereon for externally connected electronic components, an under cover (15) fitting to the upper cover (16), a wiring plate (17) disposed between the under cover (15) and the upper cover (16), wiring boards (18) disposed between the wiring plate (17) and the upper cover (16), and a control board body (19) having a substrate (44). The junction box body (14) is accommodated between the upper case (13) and the lower case (12), so that the embedding stage (24) can be a front surface in an accommodation direction. Moreover, an expanded portion (35) having a projection amount h from the embedding stage (24) to the above, which is larger than that of upper ends of the electronic components attached on the embedding stage (24), is formed on an upper end of the embedding stage (24), and the substrate (44) is accommodated in the expanded portion (35).

10 Claims, 12 Drawing Sheets

JUNCTION BOX AND JUNCTION BOX FORMING METHOD

BACKGROUND OF THE INVENTION

1. Field of the Invention

The present invention relates to a junction box and a junction box forming method, in which the junction box can connect and distribute a large number of wire harnesses intensively in the case of cabling the wire harnesses in a vehicle or the like.

2. Description of the Related Art

In a junction box mounted in a vehicle, a junction box body is configured as below. Single-layer or plural-layer wiring boards, on which desired circuits are configured by cabling bus bars and electric wires, are stacked on a wiring plate. The wiring plate having the wiring boards stacked thereon is covered with an upper cover and an under cover, and thus the junction box body is configured primarily. There is a junction box of a form, in which a control board serving as an electronic control unit is mounted on the wiring plate. The junction box body having the wiring plate and the control board formed therein as described above is accommodated in a casing provided in an engine room or the like at the time of being mounted in the vehicle or the like. In this case, electronic components for external connection, such as relays, fuses and connectors, are embedded on a front surface of the junction box body.

The casing accommodating the junction box body is divided into an upper case and a lower case. The junction box body is accommodated in the lower case in a state where the upper case is open, and then the upper case covers over the junction box body. On the junction box body accommodated in the casing, locking means is provided therewith so as not to rattle due to vibrations during running of the vehicle and the like.

However, in the conventional junction box, though the junction box body is accommodated in the casing, dew condensation occurring in the casing or on the cover surface drops as water droplets in winter and so on. In this case, the junction box body is formed to have flat surfaces, for example, formed to be a cuboid. Hence, the electronic components for external connection are set to project from the front surface of the junction box body. Therefore, the electronic components embedded on the front surface of the junction box body are splashed with the water droplets having dropped to the casing.

As described above, each surface of the junction box body is a flat shape. Thus, when the upper case is opened and the junction box body is taken out of the casing, in a state where one operator holds the junction box body tightly by both hands, another operator has released a lock of the locking means. Accordingly, when the junction box body is taken out, a plurality of operators have been required, and work efficiency has been low.

SUMMARY OF THE INVENTION

It is an object of the present invention to provide a junction box and a junction box forming method, which prevent electronic components for external connection from being splashed with water droplets by forming a visor on an upper end of the junction box body. It is another object of the present invention to provide a junction box and a junction box forming method, which can take the junction box body out of the casing by setting the visor provided on the upper end of the junction box body as a grip.

The first aspect of the present invention provides a junction box comprising: an upper case; a lower case disposed under the upper case; and a junction box body accommodated between the upper case and the lower case, the junction box body comprising: an upper cover having an embedding stage provided thereon for externally connected electronic components; an under cover fitting to the upper cover; a wiring plate disposed between the under cover and the upper cover; wiring boards disposed between the wiring plate and the upper plate, fixed to the wiring plate, stacked in a plurality of stages, and having an insulating plate; and a control board body having a substrate and fixed to the wiring plate, wherein the junction box body is accommodated between the upper case and the lower case to allow the embedding stage to be a front surface in an accommodation direction, and wherein an expanded portion having a projection amount from the embedding stage to above is formed on an upper end of the embedding stage, the projection amount being larger than projection amounts of upper ends of the electronic components attached on the embedding stage, and the substrate is accommodated in the expanded portion.

The second aspect of the present invention provides a junction box according to the first aspect of this invention, wherein the junction box body comprises: first locking means for engaging the junction box body with the lower case and for detaching the junction box body to the lower case from the above; and second locking means for engaging with the first locking means, wherein the first locking means is provided on a side surface of the junction box body and the second locking means is provided on an inner surface of the lower case, the inner surface corresponding to the side surface of the junction box body.

The third aspect of the present invention provides a junction box according to the first aspect of this invention, wherein the control board body comprises a terminal block, the terminal block is constituted of a first divided block and a second divided block, and adjacent ends of both the first divided block and the second divided block constitute a superimposed portion.

The fourth aspect of the present invention provides a junction box according to the third aspect of this invention, wherein the control board body further comprises a substrate connector, the substrate connector is provided independently of both the substrate and the terminal block.

The fifth aspect of the present invention provides a junction box according to the third aspect of this invention, wherein the terminal block is attached in substantially orthogonal to a plane direction of the insulating plate.

The sixth aspect of the present invention provides a junction box according to the fifth aspect of this invention, wherein the terminal block is fastened and fixed to the wiring plate with a screw when the substrate is mounted on the wiring plate.

The seventh aspect of the present invention provides a junction box according to the third aspect of this invention, wherein the substrate is disposed on the wiring plate in an erected state, and the terminal block is provided in substantially orthogonal to a plane direction of the substrate.

The eighth aspect of the present invention provides a junction box according to the first aspect of this invention, wherein the wiring plate has a rectangular shape and is formed of a hard resin, and a plurality of cabling paths having electric wires cabled thereon are formed on a back surface of the wiring plate.

The ninth aspect of the present invention provides a junction box according to the first aspect of this invention, wherein a heat-shielding partition wall for shielding between a power unit and a control unit is provided in the expanded portion.

The tenth aspect of the present invention provides a junction box forming method comprising the steps of: accommodating a junction box body in a lower case to allow an expanded portion of the junction box body to be disposed above; fitting an upper case to an outer circumference of the lower case from above of the lower case; engaging a lock hook of the upper case and a first engaging projection of the lower case with each other; coupling partner connectors to a connector outlet and a substrate connector of the junction box body through an aperture; cabling a wire harness between an upper semicylinder portion and a lower semicylinder portion; disposing a closing member on the aperture; engaging a lock hook of the closing member and a second engaging projection of the lower case; engaging first lock pieces of both sidewalls in a Y direction of the junction box body with engaging convex portions provided on an inner surface of the lower case; and elastically abutting second lock pieces of both sidewalls in an X direction of the junction box body against an inner surface of a ceiling of the upper case and a bottom of the lowercase.

DETAILED DESCRIPTION OF THE PREFERRED EMBODIMENTS

Hereafter, in order to describe the present invention more in detail, preferred embodiments of this invention will be explained with reference to the accompanied drawings below.

Figure 1:
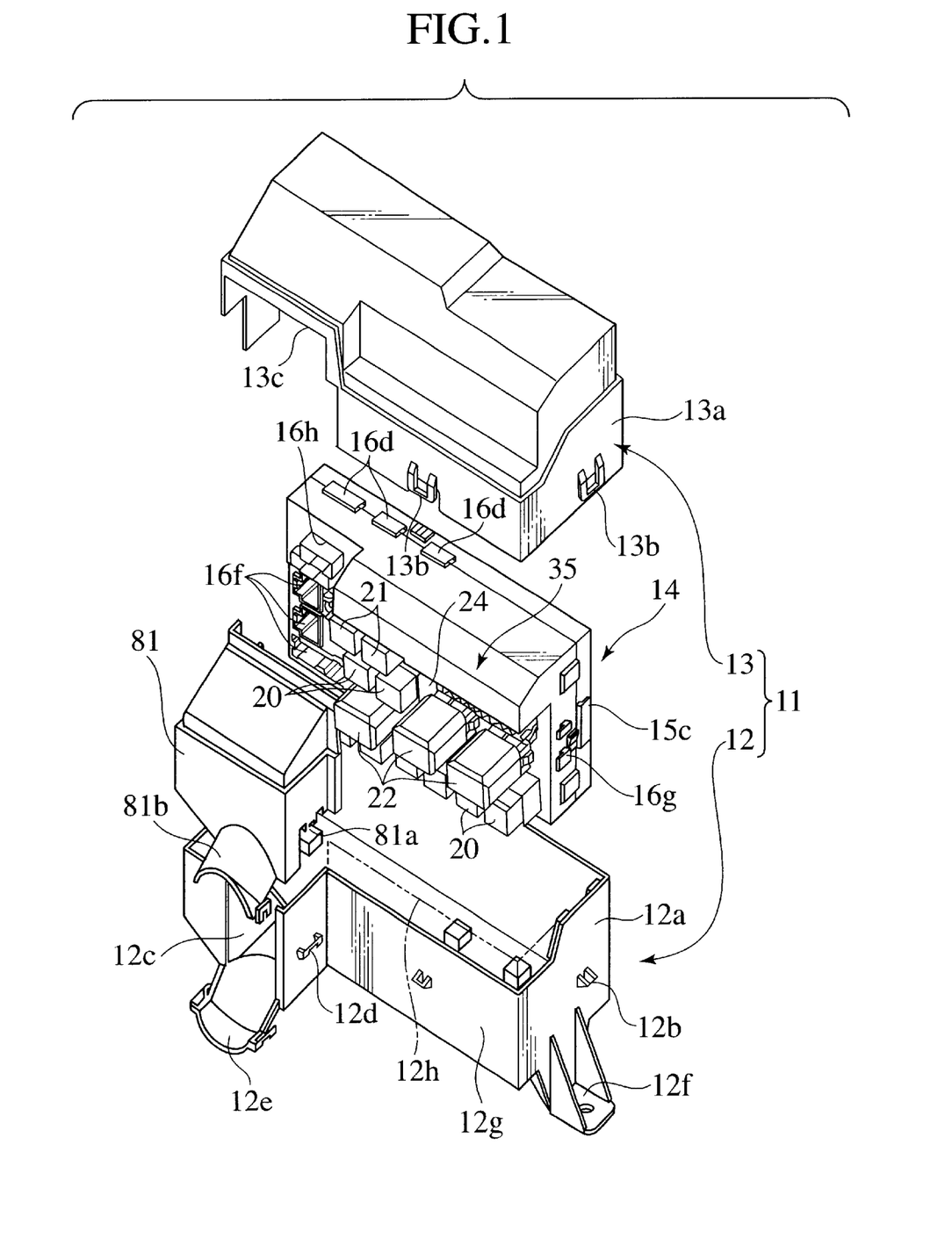
FIG. 1 is an exploded perspective view showing a junction box.

As shown in FIG. 1, a junction box 10 of this embodiment is configured in such a manner that a junction box body 14 is accommodated between a lower case 12 and an upper case 13 of a casing 11. In a state of accommodating the junction box body 14, the junction box 10 is mounted in an engine room or the like of a vehicle. In the junction box 10, on an upper end of an embedding stage 24 of an upper cover 16, an expanded portion 35 having a projection amount h larger than those of electronic components embedded on the embedding stage 24 is provided. A substrate 44 is accommodated inside the expanded portion 35.

(a) Casing 11

As shown in FIG. 1, in the casing 11, a sidewall 13a of the upper case 13 fits to an outer circumference of a sidewall 12a of the lower case 12. A lock hook 13b of the upper case 13 detachably engages with an engaging projection 12b of the lower case 12.

In the upper case 13 and the lower case 12, apertures 13c and 12c are formed, respectively, which are obtained by notching portions corresponding to connector outlets 16f provided in an upper cover 16 and a substrate connector 45 provided adjacently to the upper cover 16. The apertures 13c and 12c form one aperture when the upper case 13 and the lower case 12 fit with each other.

Between the apertures 13c and 12c, a closing member 81 independent of the upper case 13 and the lower case 12 is provided. The closing member 81 closes a space between the apertures 13c and 12c when the upper case 13 and the lower case 12 fit with each other. In the closing member 81, a lock hook 81a is detachably fixed to an engaging projection 12d of the lower case 12.

A semicylinder portion 12e facing upward, which is formed in a lower side of the aperture 12c, and a semicylinder portion 81b facing downward, which is formed in a lower side of the closing member 81, are jointed into a cylindrical shape, whereby wire harnesses of partner connectors (not shown) coupled to the connector outlets 16f and the substrate connector 45 are passed therethrough in a bounded state. Moreover, on the lower case 12, an attachment foot 12f is erectly provided, which is means for fixing the lower case 12 to a vehicle body.

As shown in FIG. 1, when the junction box body 14 is accommodated in the casing 11, the junction box body 14 is accommodated in the lower case 12 such that the expanded portion 35 is disposed above. Then, from the above, the upper case 13 fits to the outer circumference of the lower case 12. The lock hook 13b and the engaging projection 12b engage with each other. Through the aperture, the connector outlets 16f and the substrate connector 45 of the junction box body 14 are coupled to the partner connectors. The wire harnesses are cabled between the upper and lower semicylinder portions 81b and 12e. The closing member 81 is disposed on the aperture, and the lock hook 81a engages with the engaging projection 12d.

When the junction box body 14 is inserted from the above to the lower case 12 to be accommodated therein, and the lower case 12 is closed by the upper case 13, first lock pieces 27 on both sidewalls 16a and 15a in the Y direction (see FIG. 2) of the junction box body 14 engage with engaging convex portions (not shown) provided on an inner surface of the lower case 12. Moreover, in second lock pieces 28 on the both sidewalls 16a and 15a in the X direction (see FIG. 2) of the junction box body 14, outer side surfaces of parallel projection portions 28b (thickest portions of the slant surfaces 28b) elastically abut against inner surfaces of a ceiling of the upper case 13 and a bottom of the lowercase 12, so that the junction box body 14 can be prevented from rattling up and down in the casing 11.

When the junction box body 14 is accommodated in the casing 11, the embedding stage 24 of the upper cover 16 is disposed toward a front surface 12g of the lower case 12. In this case, fuse outlets 16e of the embedding stage 24 are located toward an upper right-half portion of the front surface 12g (shown by a two-dot chain line in the drawing) of the lower case 12. In this embodiment, the upper right-half portion is cut and removed in advance, and thus an aperture 12h is formed so as to expose the fuse outlets 16e.

(b) Junction Box Body 14

Figure 2:
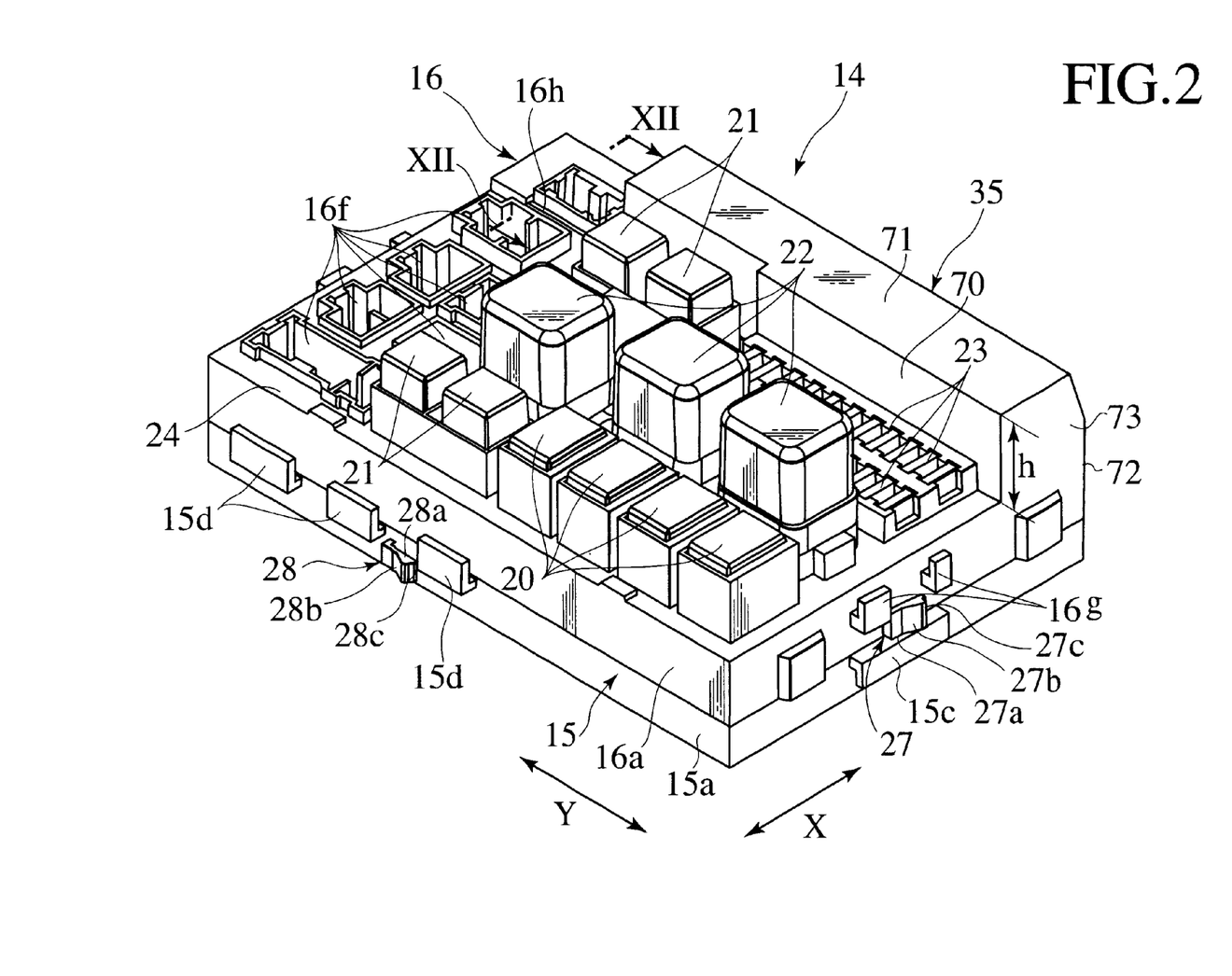
FIG. 2 is a perspective view showing a junction box body of the junction box.
Figure 3:
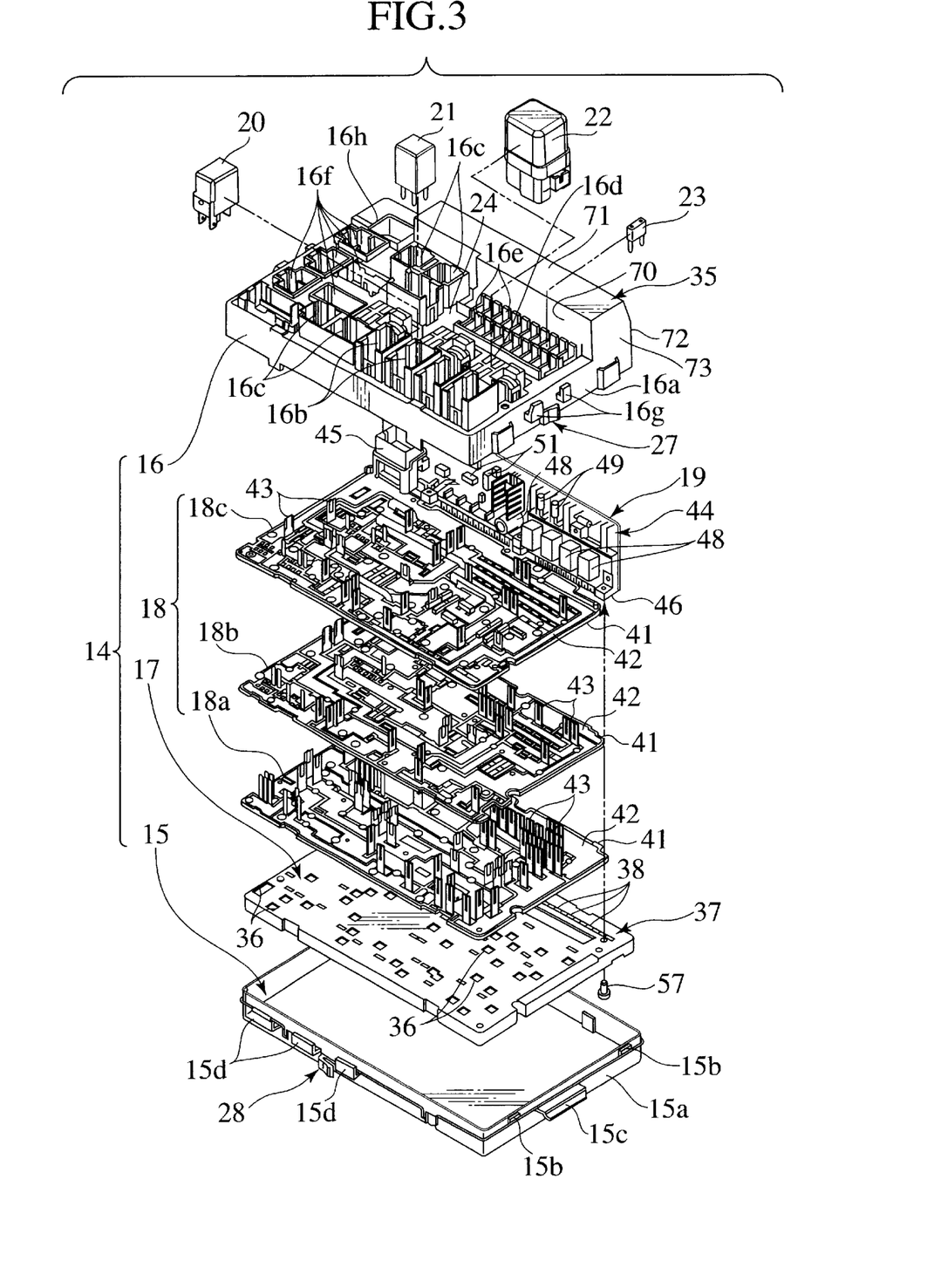
FIG. 3 shows an exploded perspective view showing the junction box body of the junction box.

As shown in FIGS. 2 and 3, the junction box body 14 is constituted of a wiring plate 17, wiring boards 18 stacked in a plurality of stages and a control board body 19 fixed to the wiring plate 17, all of which are formed between the under cover 15 and the upper cover 16. The upper cover 16 detachably fits to the under cover 15 in such a manner that the sidewall 16a surrounding the circumference of the upper cover 16 detachably fits to the sidewall 15a surrounding the circumference of the under cover 15 with lock hooks 15b on an upper end of the outer circumference of the sidewall 15a. Between the upper cover 16 and the under cover 15, the wiring plate 17 and the control board body 19 are arranged.

(c) Upper Cover 16

Figure 4:
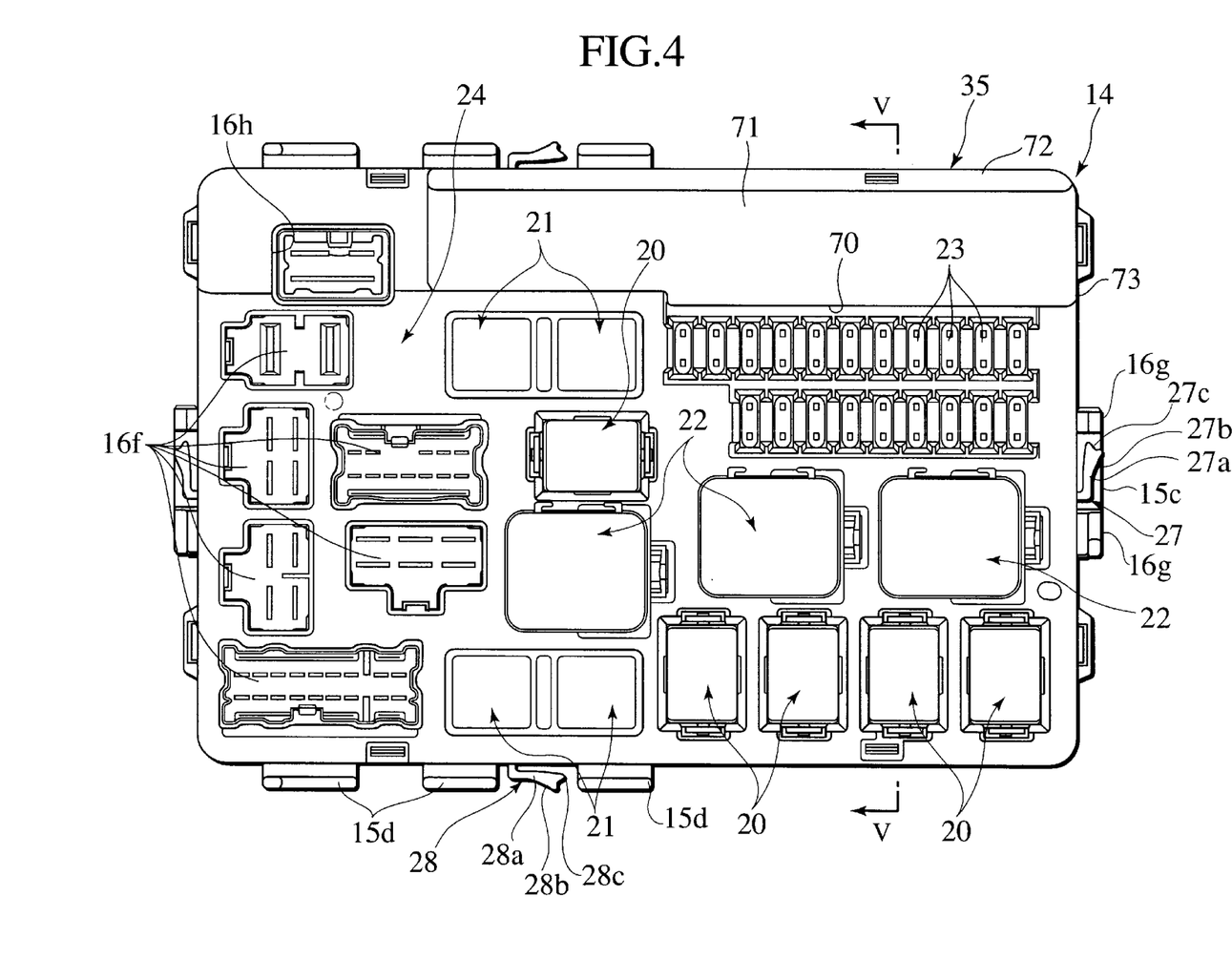
FIG. 4 is a plan view showing the junction box body.

As shown in FIGS. 2, 3 and 4, the upper cover 16 serves as the embedding stage 24, on which externally connected electronic components are embedded, which include a variety of relays such as micro relays 20, half-micro relays 21 and 2M relays 22, and fuses 23. On the embedding stage 24, there are provided various relay outlets 16b, 16c and 16d for the micro relays 20, the half-micro relays 21 and the 2M relays 22. Moreover, the fuse outlets 16e are provided for the fuses 23, respectively.

On one side of the upper cover 16, that is, on the left end of FIG. 4, the plurality of connector outlets 16f are provided, to which the partner connectors are detachably inserted. Moreover, as shown in FIG. 2, on the both sidewalls 15a and 16a in the Y direction of the upper cover 16 and the under cover 15, first guide pieces 16g and 15c, each having an "L" shape in section, are integrally provided to be projected, respectively. Furthermore, on the sidewalls 15a in the X direction perpendicular to the surfaces of the under cover 15, on which the first guide pieces 15c are provided, second guide pieces 15d, each having an "L" shape in section, are integrally provided to be projected similarly. In addition, the expanded portion 35 is provided on one surface of the embedding stage 24 for the electronic components. Inside the expanded portion 35, the control board body 19 fixed to the wiring plate 17 is accommodated.

As shown in FIG. 2, on the both sidewalls 16a in the Y direction of the upper cover 16, the first lock pieces 27 are projectingly provided as locking means. Moreover, on the both sidewalls 15a in the X direction of the under cover 15, the second lock pieces 28 are projected as locking means. These first and second lock pieces 27 and 28 are projectingly provided vertically from the sidewalls 16a and 15a, respectively, and are extended in parallel to these sidewalls 16a and 15a, thereby being formed into the "L" shapes in section as a whole. On the outer surfaces of the parallel projection portions 27a and 28a of the first and second lock pieces 27 and 28, the slant surfaces 27b and 28b are formed, respectively. The slant surfaces 27b and 28b become gradually thicker toward tips thereof. On the tips of the slant surfaces 27b and 28b, step-shaped engaging portions 27c and 28c are formed, respectively.

When the junction box body 14 is accommodated in the lower case 12 (see FIG. 1), any of the first and second lock pieces 27 and 28 engage with the engaging convex portions on the inner surface of the casing 11 depending on the direction (X direction or Y direction) of accommodating the junction box body 14. Specifically, in the engagement of the first and second lock pieces 27 and 28, when any of the slant surfaces 27b and 28b are pressed to the engaging convex portions accompanied with a fall thereof in the case of accommodating the junction box body 14, the parallel projection portions 27a or 28a are once bent and deformed inward. Thereafter, at the time when the slant surfaces 27b or 28b are moved off the engaging convex portion with another fall, the parallel projection portions 27a or 28a are recovered outward, and thus the engaging portions 27c or 28c engage with the engaging convex portion.

In such an engagement state as described above, the direction of projecting the parallel projection portion 27a or 28a is reverse (that is, above) to the direction of accommodating the junction box body 14. When the lock is released, a jig such as a screwdriver with a thin tip is inserted from the above between the junction box body 14 and the casing 11, and the tip of the jig is hooked on the tip of the engaging portion 27c or 28c, and thus the parallel projection portion 27a or 28a is bent inward. Thus, the engagement of the engaging portion 27c or 28c with the engaging convex portion can be readily released.

First guide pieces 16g and 15c and second guide pieces 15d are provided in the vicinities where the first and second lock pieces 27 and 28 are formed. Each of the first and second guide pieces 16g, 15c and 15d projects in an "L" shape in section. These first and second guide pieces 16g, 15c and 15d serve as guides when the junction box body 14 is accommodated in the lower case 12. Therefore, the junction box body 14 can be located on a specified position of the casing 11.

(d) Wiring Plate 17

Figure 5:
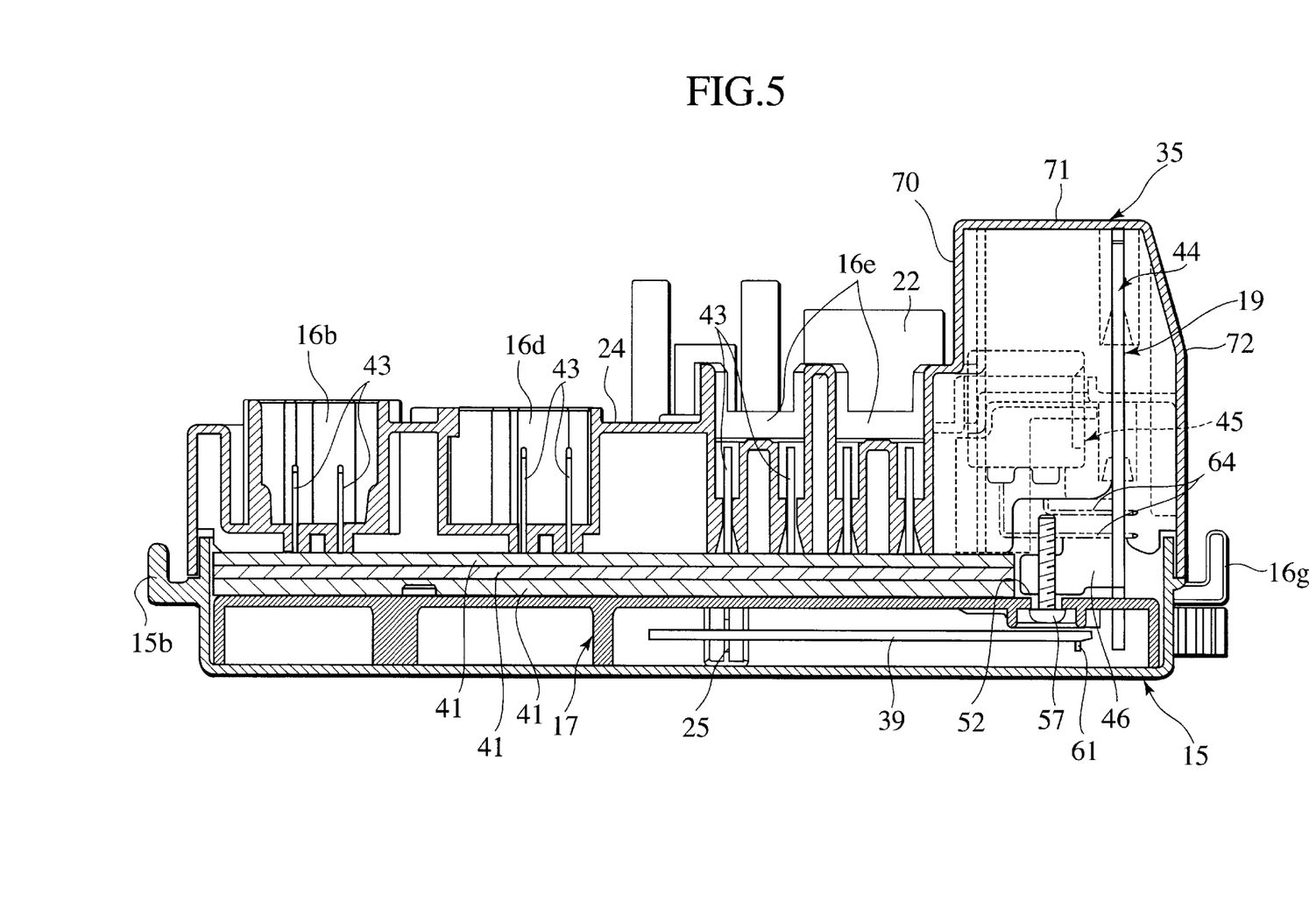
FIG. 5 is a cross-sectional view cut along a line V—V of FIG. 4, showing an inside of the junction box body.
Figure 6:
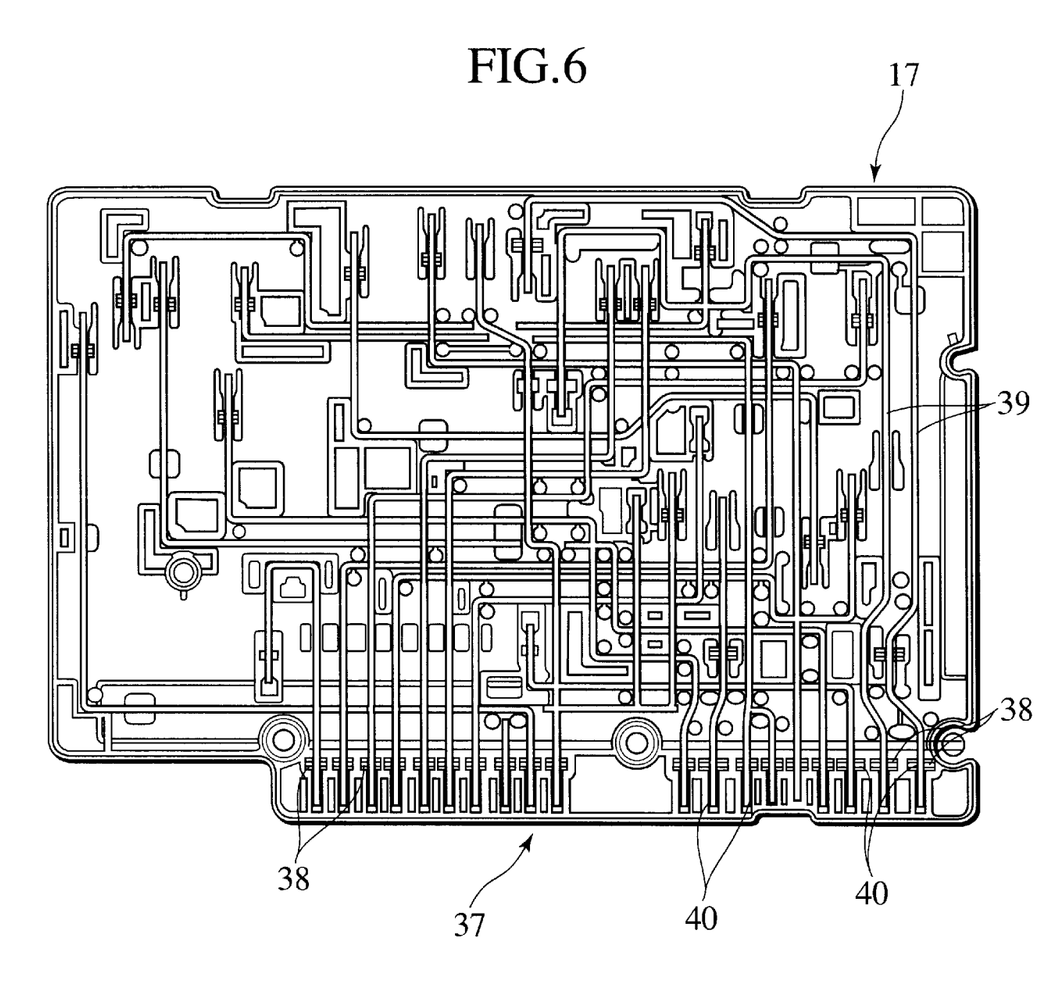
FIG. 6 is a plan view showing a back surface of a wiring plate.

As shown in FIG. 3, the wiring plate 17 is a rectangular hard-resin plate. On an upper surface thereof, a large number of pressure-welding terminal insertion apertures 36 are formed, and on a back surface thereof, a substrate fixture 37 is provided. Also on the substrate fixture 37, a plurality of pressure-welding terminal insertion apertures 38 are formed in line along a side portion of the wiring plate 17. As shown in FIGS. 5 and 6, on the back surface of the wiring plate 17, a plurality of cabling paths are formed, along which electric wires 39 are cabled. The electric wires 39 are cabled along these cabling paths, and thus a circuit is configured. End portions 40 of the cabled electric wires 39 are cabled on the back surface of the substrate fixture 37 to correspond to the pressure-welding terminal insertion apertures 38. As shown in FIG. 5, the wiring plate 17 is accommodated in the under cover 15. Moreover, on an upper surface of the wiring plate 17, wiring boards 18a, 18b and 18c are stacked.

(e) Wiring Board 18

As shown in FIG. 3, in each of the wiring boards 18 (18a, 18b and 18c), a specified circuit is formed of a bus bar 42 on an insulating plate 41. On each circuit, a large number of terminal portions 43 are erectly provided. The terminal portions 43 of the lower wiring board 18a penetrate the wiring boards 18b and 18c located thereon and projects to an upper surface of the upper wiring board 18c. The terminal portions 43 of the intermediate wiring board 18b project through the upper wiring board 18c. The wiring boards 18a, 18b and 18c are vertically superimposed. A pressure-welding terminal portion 25 provided on the bus bar 42 and bent downward penetrates the wiring plate 17 and is pressure-welded to the electric wires 39 cabled on the back surface of the wiring plate 17. Moreover, on the wiring plate 17, the control board body 19 is fixed together with the plurality of stacked wiring boards.

(f) Control Board Body 19

Figure 7:
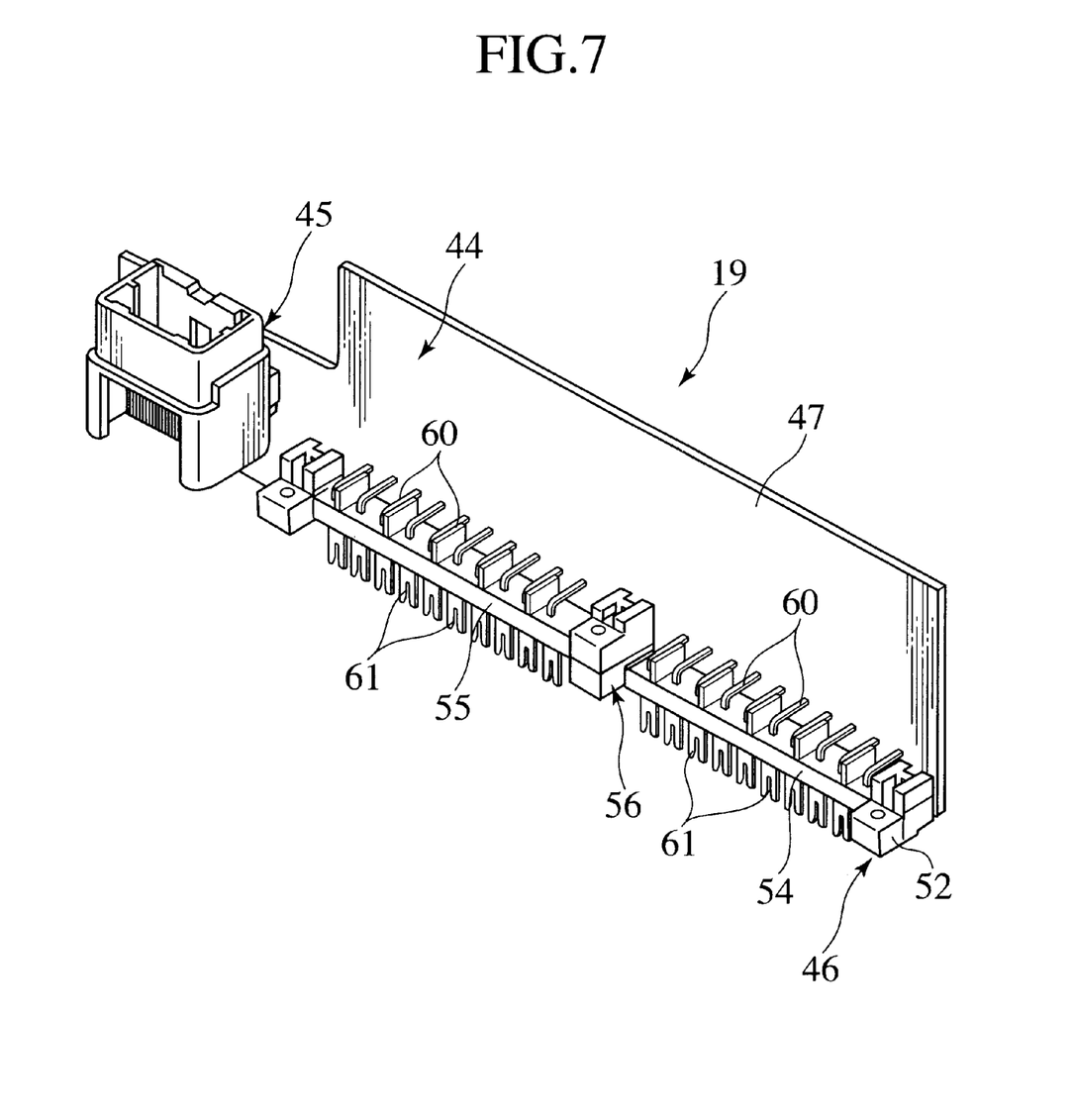
FIG. 7 is a perspective view showing a control board body.
Figure 8:
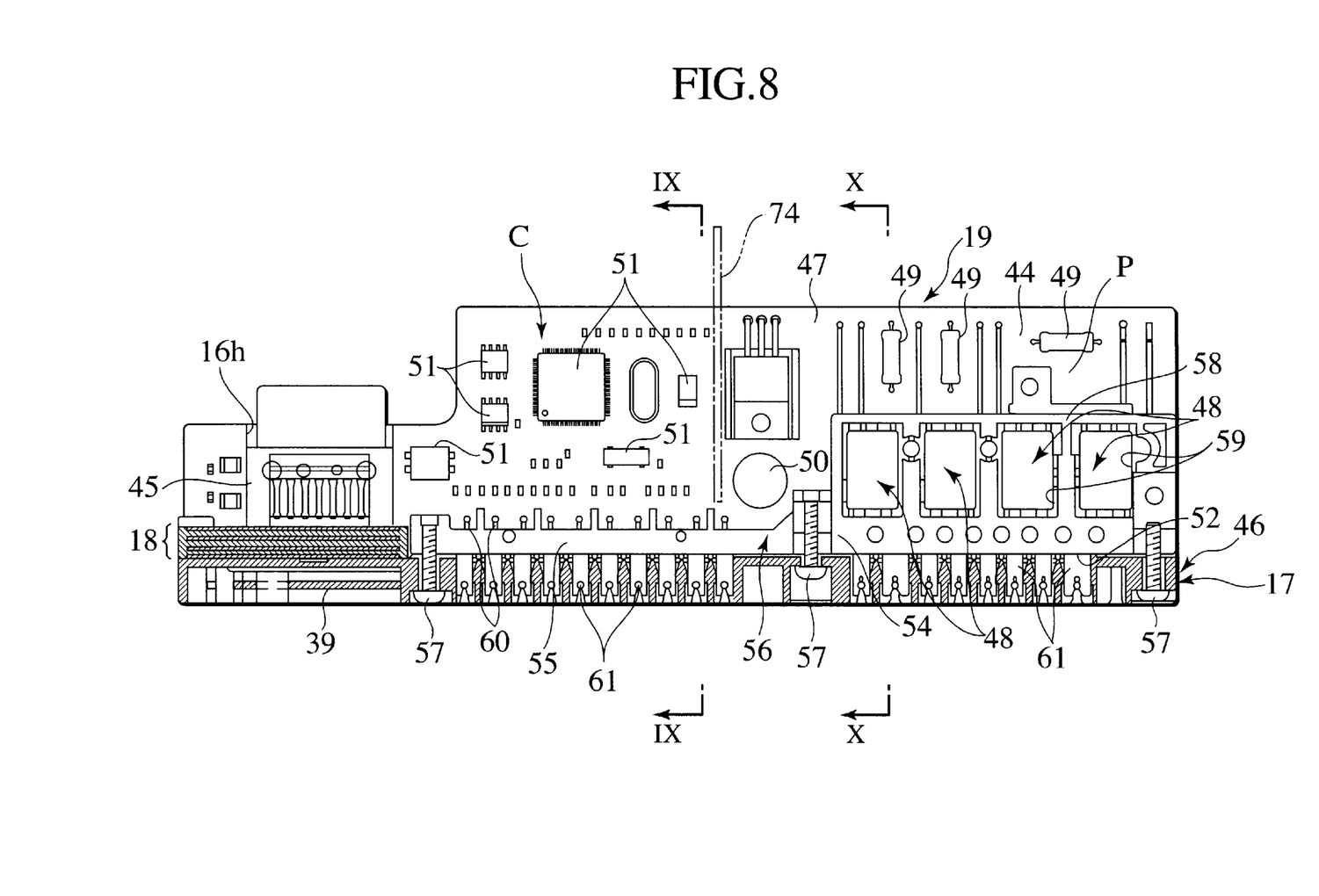
FIG. 8 is a front view showing the control board body.
Figure 9:
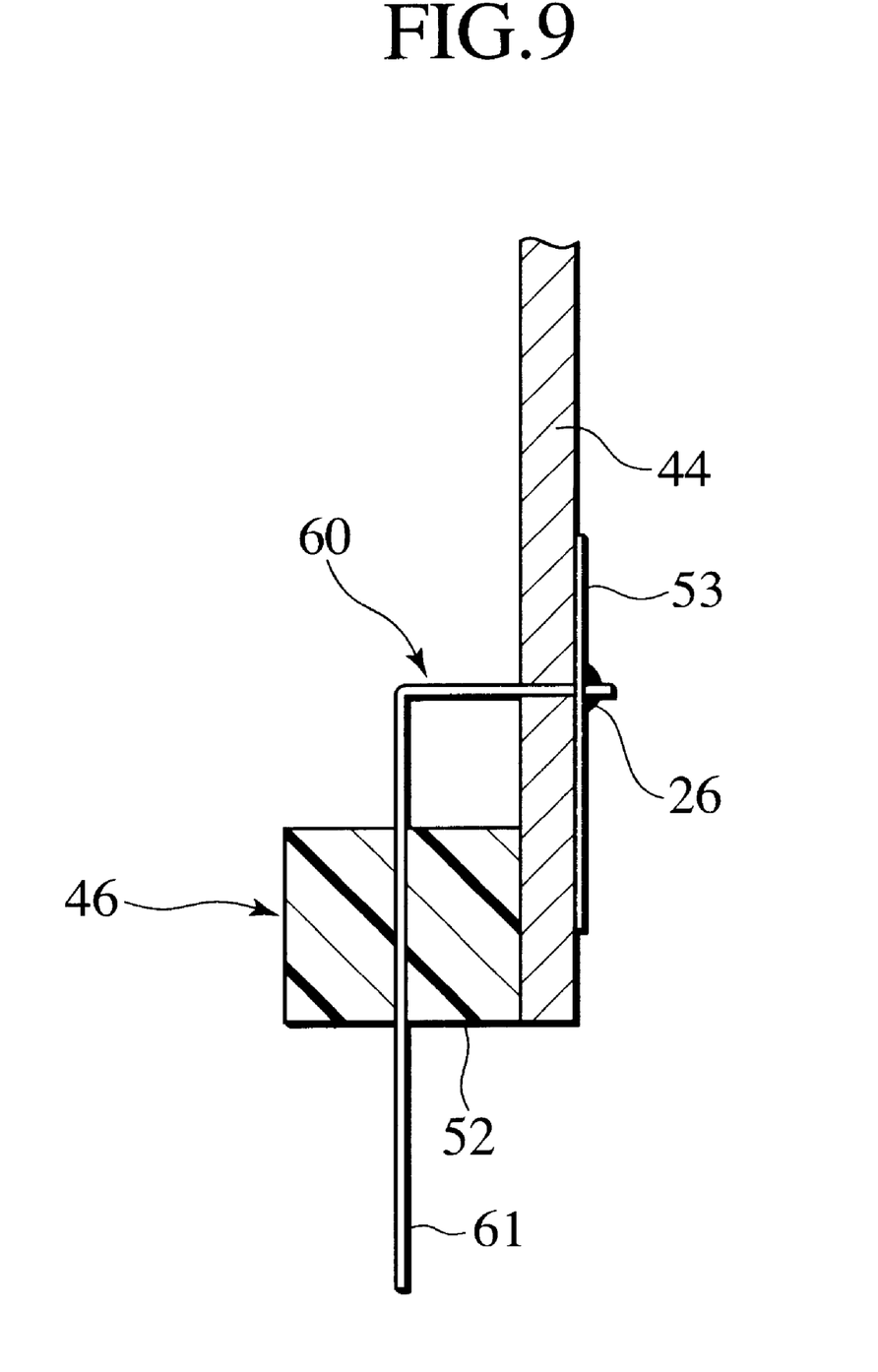
FIG. 9 is a cross-sectional view cut along a line IX—IX of FIG. 8, showing an arrangement of a substrate and a terminal block and a connection relation therebetween.

As shown in FIGS. 7 and 8, the control board body 19 is constituted of a substrate 44, a substrate connector 45 fixed to the substrate 44, and a terminal block 46 for fixing the substrate 44 on the wiring plate 17. On the insulating plate 47, a variety of electronic components such as relays 48, resistors 49, a coil 50 and elements 51 constituting the control circuit are attached. Moreover, on an end of the substrate 44 in a longitudinal direction, the substrate connector 45 is provided. The substrate 44 is disposed erectly on the wiring plate 17. As shown in FIG. 9, the terminal block 46 is fitted on a front surface of a lower end of the substrate 44 (face side of the sheet in the drawing).

In the variety of electronic components attached on the substrate 44, the relays 48, the resistors 49 and the coil 50 constitute a power unit P. Moreover, the elements 51 constitute a control unit C. As shown in FIG. 8, the power unit P having a large heat value is disposed on one side in the longitudinal direction of the insulating plate 47 such that the constituent components thereof are adjacent to one another. Moreover, the control unit C having a small heat value is disposed on the other side in the longitudinal direction of the insulating plate 47 such that the constituent components thereof are adjacent to one another.

The relays 48, the resistors 49 and the coil 50, which constitute the power unit P having a large heat value, and the elements 51 constituting the control unit C having a small heat value are connected to each other by a thin circuit pattern 53 (see FIG. 9). The circuit pattern 53 is formed by printing a conductor on the insulating plate 47. A thickness of the circuit pattern 53 is decided depending on a size of a printing width of the conductor. The substrate 44 is fixed to the substrate fixture 37 of the wiring plate 17 by the terminal block 46.

(g) Terminal Block 46

As shown in FIGS. 7 and 8, the terminal block 46 is divided into two at an approximate center thereof in the longitudinal direction and is constituted of a first divided block 54 and a second divided block 55. As shown in FIG. 7, ends of the first and second divided blocks 54 and 55, which are adjacent to each other, are superimposed on each other (superimposed portion 56). As shown in FIG. 8, by screws 57 as fastening members inserted from the back surface of the wiring plate 17, the both ends of the terminal block 46 and the superimposed portion 56 are fastened and fixed to the wiring plate 17.

Figure 10:
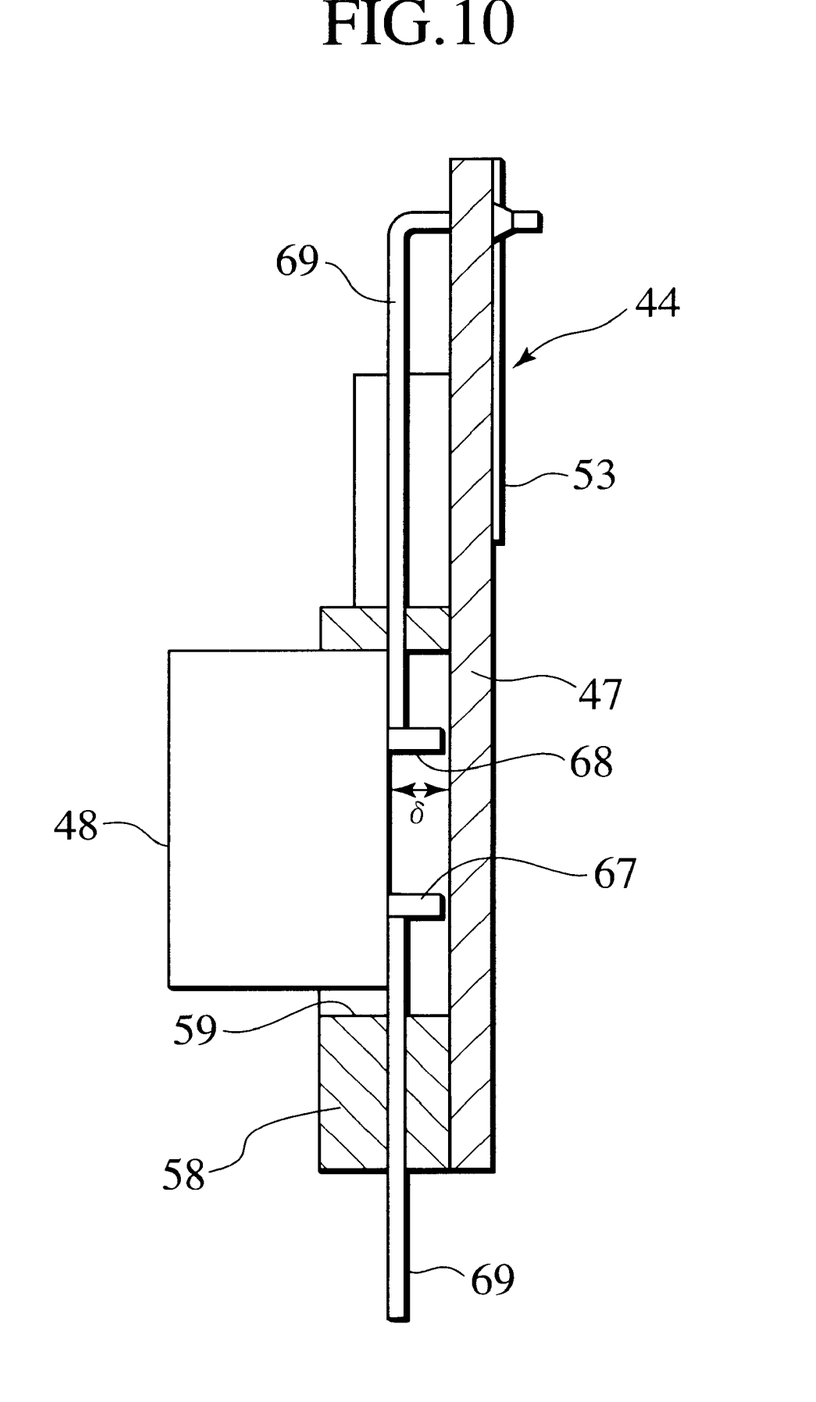
FIG. 10 is a cross-sectional view cut along a line X—X of FIG. 8, showing an arrangement of the substrate and a relay and a connection relation therebetween.
Figure 11:
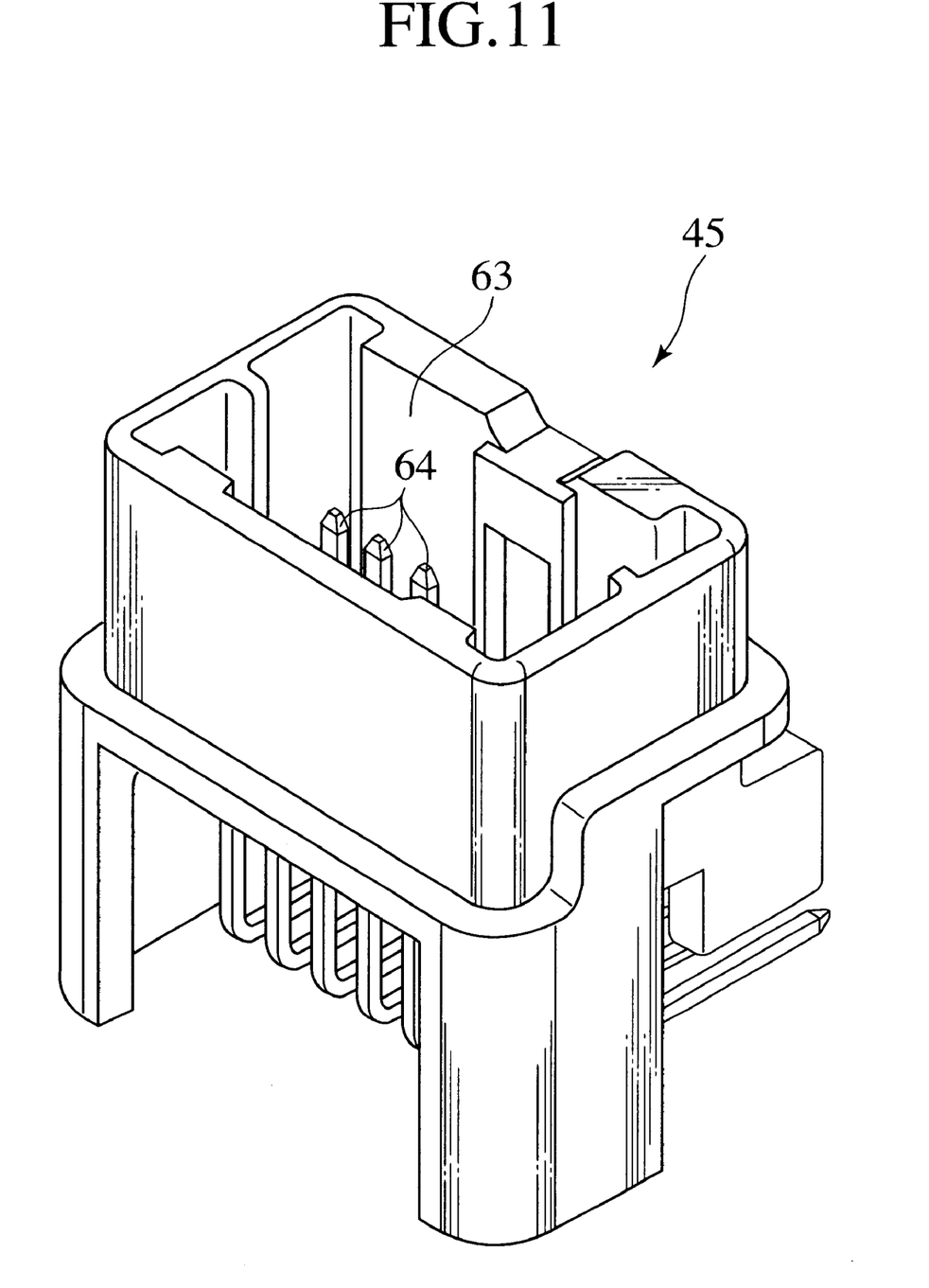
FIG. 11 is a perspective view showing a substrate connector.

As shown in FIG. 10, on an inner surface of the first divided block 54, a relay holder plate 58 is provided parallel to the insulating plate 47 of the substrate 44. On a surface of the relay holder plate 58, windows 59 are formed corresponding to arrangement spots of the relays 48. The relays 48 fit into the windows 59 and are held therein, and thereby the relays 48 attached while being floated from the insulating plate 47 are stably held.

As shown in FIG. 9, a plurality of lead terminals 60 are buried integrally on the terminal block 46. On one end of each lead terminal 60, a pressure-welding terminal portion 61 is formed. On the other end thereof, the lead terminal 60 is bent in an "L" shape, and a tip thereof penetrates the substrate 44 and is soldered by solder 26 on the circuit pattern 53 of the substrate 44. When the terminal block 46 is fixed to the substrate fixture 37 of the wiring plate 17, each pressure-welding terminal portion 61 of the lead terminal 60 is inserted into the wiring plate 17 through the pressure-welding terminal insertion aperture 38 formed in the wiring plate 17, and is pressure-welded to the terminal of the electric wire 39. In a state where the terminal block 46 is fixed to the wiring plate 17, the terminal block 46 is at approximately right angles to the insulating plate 47 of the substrate 44, so that the substrate 44 is mounted perpendicularly to the wiring plate 17. The substrate connector 45 is fixed to the surface of the substrate 44.

(h) Substrate Connector 45

As shown in FIG. 7, the substrate connector 45 is provided independently of the substrate 44. The partner connector is inserted into an outlet 63 formed in the substrate connector 45. Ends of a plurality of terminals 64 to be connected to the partner connector project into the outlet 63. The other ends of the terminals 64 project downward (in the drawing) of the outlet 63, and tips thereof are orderly bent perpendicularly to the substrate 44.

Figure 12:
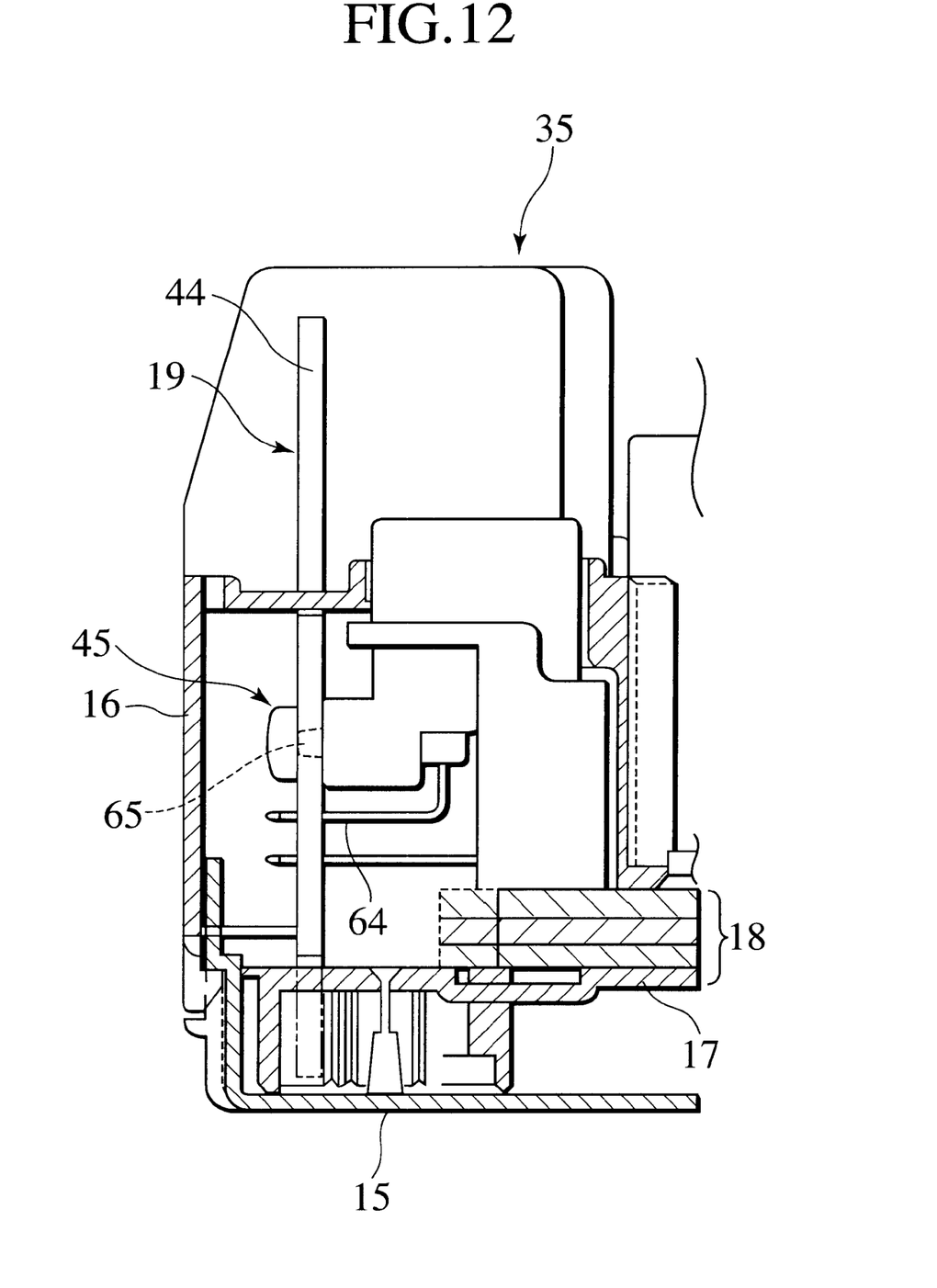
FIG. 12 is a cross-sectional view cut along a line XII—XII of FIG. 2, showing an arrangement relation between the substrate connector and a wiring plate in an expanded portion.

As shown in FIG. 12, a projection 65 provided on the back surface of the substrate connector 45 is forcibly inserted into a fitting hole (not shown) formed in the insulating plate 47 of the substrate connector 45. Moreover, the tips of the terminals 64 are inserted into the substrate 44 and are connected to the specified circuit pattern 53. An aperture of the outlet 63 of the substrate connector 45 is made to face outward of the junction box body 14 from an aperture 16*h* formed in the upper cover 16.

(i) Relay 48

For the relays 48, electromagnetic solenoids are employed, in which on/off switching is carried out by the electromagnetic solenoids. Since each of the electromagnetic solenoids has a large heat value, each relay 48 is supported by the relay holder plate 58 as shown in FIG. 10, whereby the relay 48 is attached so as to be spaced from the insulating plate 47 of the substrate 44 by a specified interval δ.

On the relay 48 attached so as to be spaced from the insulating plate 47, upper and lower lead terminals 69 and 69 are connected to power terminals 67 and 68. At least one of the lead terminals 69 is extended parallel to the insulating plate 47 and projects long between the relay 48 and the insulating plate 47. A tip thereof exposed by such projection is bent in a direction of the insulating plate 47 and soldered to the circuit pattern 53. In this case, the exposed lead terminal 69 can be provided with a function of heat radiation.

The control board body 19 having the terminal block 46 and the substrate connector 45 attached and being fixed to the wiring plate 17 is accommodated in the expanded portion 35 of the upper cover 16.

(j) Expanded Portion 35 of Upper Cover 16

As shown in FIGS. 2 and 3, in the upper cover 16, on one side edge on a side (back side of the sheet in FIG. 2) of the embedding stage 24, where the control board body 19 is disposed, the expanded portion 35 having the projection amount h larger than those of the variety of externally connected relays 20, 21 and 22 and the fuses 23 is provided. As shown in FIG. 5, the substrate 44 is accommodated in the expanded portion 35.

As shown in FIGS. 2 and 5, the expanded portion 35 is formed in an approximate "U" shape in section, which is formed of a heat shield wall 70 shielding the various relay outlets 16*b*, 16*c* and 16*d* of the upper cover 16 and the substrate 44, a ceiling wall 71 continuous with the heat shield wall 70, and a backside wall 72 covering a backside of the control substrate 44. As shown in FIG. 2, both side surfaces of the expanded portion 35 are closed by heat-shielding partition walls 73.

As shown in FIG. 8, on the substrate 44, the power unit P composed of the relays 48, the resistors 49, the coil 50 and the like, each of which has a large heat value, and the control unit C composed of the elements constituting the control circuit, each of which has a small heat value, are disposed so as to be spaced from each other. As shown in FIG. 8, a heat-shielding partition wall 74 inserted between the power unit P and the control unit C and shielding the power unit P and the control unit C from each other is provided in the expanded portion 35. The heat-shielding partition wall 73 is shown by a two-dot chain line in FIG. 8.

In a state where the substrate 44 is accommodated between the upper cover 16 and the under cover 15, the expanded portion 35 covers an outside of the control board body 19, and the heat-shielding partition wall 74 is inserted into an interface between the unit having a large heat value and the unit having a small heat value of the substrate 44. As described above, the junction box body 14 is mounted on the vehicle in a state of being accommodated in the casing 11 composed of the upper case 13 and the lower case 12.

In the junction box 10 of this embodiment, the substrate 44 serving as the control unit is mounted on the wiring plate 17. The mounted substrate 44 is accommodated between the upper cover 16 and the under cover 15, and thus the junction box body 14 is configured. The junction box body 14 is accommodated in the casing 11 composed of the upper case 13 and the lower case 12, and thus the junction box 10 is configured. The lower case 12 of the junction box 10 is attached into the engine room of the vehicle with the attachment foot 12f, so that the wire harnesses (not shown) of the various electronic components equipped with the vehicle are adjacently connected in a narrow range.

Moreover, with regard to the expanded portion 35 formed on the upper end of the embedding stage 24 of the upper cover 16, the projection amount h is larger than those of the various electronic components such as the externally-connected various relays 20, 21 and 22 and fuses 23, which are attached to the relay outlets 16b, 16c and 16d and the fuse outlets 16e of the embedding stage 24. Thus, the expanded portion 35 covers as the visor over these electronic components. Therefore, even when condensed water droplets drop in the inside of the upper case 13, the water droplets are received by the expanded portion 35, and thus the various electric components can be prevented from being splashed with the water droplets. Accordingly, the cause of disorder such as a short circuit of the electronic components can be eliminated, and thereby the reliability of the junction box 10 can be enhanced.

Furthermore, with regard to the junction box 10, when the substrate 44 is mounted on the wiring plate 17, the terminal block 46 attached in the approximately right angle direction to the plane direction of the insulating plate 41 is fastened and fixed to the wiring plate 12 with the screws 57 interposed therebetween. Thus, the substrate 44 is mounted perpendicularly to the wiring plate 17. Further, a constitution is adopted, in which the substrate 44 mounted perpendicularly to the wiring plate 17 as described above is accommodated in the expanded portion 35 of the upper cover 16. Therefore, the inner space of the expanded portion 35 can be effectively utilized as the accommodation portion for the substrate 44. Accordingly, the entire enlargement of the junction box body 14 can be prevented.

In addition, the expanded portion 35 is provided so as to project to the upper end of the junction box body 14, such that the expanded portion 35 can be used as a grip when the junction box body 14 is taken out of the casing 11. As shown in FIG. 2, in a state where the junction box body 14 is accommodated in the casing 11, the first lock pieces 27 provided on the both sidewalls 16a in the Y direction of the upper cover 16 engage with the engaging convex portions of the lower case 12, and thus the junction box body 14 is locked. When the junction box body 14 is taken out of the lower case 12, the operator can readily grasp the expanded portion 35 by one hand. Therefore, the jig such as a screwdriver is inserted between the side surface of the junction box body 14 and the inner surface of the lower case 12 by the other hand, whereby the engagement of the first lock pieces 27 can be released. Accordingly, one operator is sufficient for taking out the junction box body, so that the workability can be improved to a great extent.

While the preferred embodiments of the present invention have been described using specific terms, such description is for illustrative purposes. It is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention as defined in the following claims.

What is claimed is:

1. A junction box comprising:
   an upper case;
   a lower case disposed under the upper case; and
   a junction box body accommodated between the upper case and the lower case,
   the junction box body comprising:
      an upper cover having an embedding stage provided thereon for accepting externally connected electronic components;
      an expanded portion located adjacent the embedding stage, the expanded portion comprising a projection which is configured to project beyond upper ends of externally connected electronic components accepted by the embedding stage;
      an under cover fitting to the upper cover;
      a wiring plate disposed between the under cover and the upper cover;
      wiring boards disposed between the wiring plate and the upper cover, fixed to the wiring plate, stacked in a plurality of stages, and having an insulating plate; and
      a control board body comprising a substrate and being fixed to the wiring plate, the substrate being accommodated in the expanded portion,
   wherein the junction box body is accommodated between the upper case and the lower case such that the embedding stage presents a front surface in an accommodation direction.

2. The junction box of claim 1, wherein the junction box body further comprises first locking means for engaging and disengaging the junction box body with the lower case from above of the lower case
   wherein the lower case is configured to engage the first locking means, and
   wherein the first locking means is provided on a side surface of the junction box body, the first locking means being configured to engage an inner surface of the lower case, the inner surface corresponding to the side surface of the junction box body.

3. The junction box of claim 1, wherein the control board body further comprises a terminal block, the terminal block comprising a first divided block and a second divided block, and adjacent ends of both the first divided block and the second divided block comprising a superimposed portion.

4. The junction box of claim 3, wherein the control board body further comprises a substrate connector, the substrate connector being provided independently of both the substrate and the terminal block.

5. The junction box of claim 3, wherein the terminal block is attached substantially orthogonal to a plane defined by the insulating plate.

6. The junction box of claim 5, wherein the terminal block is fastened and fixed to the wiring plate with a screw when the substrate is mounted on the wiring plate.

7. The junction box of claim 3, wherein the substrate is disposed on the wiring plate in a substantially upright manner, and the terminal block is provided substantially orthogonal to a plane defined by the substrate.

8. The junction box of claim 1, wherein the wiring plate has a rectangular shape and comprises a hard resin, and a plurality of cabling paths having electric wires formed on a back surface of the wiring plate.

9. The junction box of claim 1, wherein the expanded portion further comprises a heat-shielding partition wall for shielding a control unit located in the expanded portion from a power unit.

10. A method of forming a junction box comprising:

accommodating a junction box body in a lower case such that an expanded portion of the junction box body is disposed above an upper edge of the lower case;

fitting an upper case to an outer circumference of the lower case from above of the lower case;

engaging a lock hook of the upper case with a first engaging projection of the lower case;

coupling partner connectors through an aperture to a connector outlet and a substrate connector of the junction box body;

cabling a wire harness between an upper semicylinder portion and a lower semicylinder portion, which define an aperture;

disposing a closing member on the aperture defined by the upper and lower semicylinder portion;

engaging a lock hook of the closing member with a second engaging projection of the lower case engaging first lock pieces of two sidewalls of the junction box body with an inner surface of the lower case; and elastically abutting second lock pieces of two sidewalls of the junction box body against an inner surface of a ceiling of the upper case and a bottom of the lower case.

* * * * *